United States Patent [19]

Turk

[11] Patent Number: 4,717,553

[45] Date of Patent: Jan. 5, 1988

[54] REMOVAL OF AMINES FROM AIR STREAMS

[75] Inventor: Amos Turk, Danbury, Conn.

[73] Assignee: J. Michael Brassey, New York, N.Y. ; a part interest

[21] Appl. No.: 918,072

[22] Filed: Oct. 14, 1986

[51] Int. Cl.$^4$ ............................................... B01J 8/00
[52] U.S. Cl. .................................................. 423/245
[58] Field of Search ......................................... 423/245

[56] References Cited

U.S. PATENT DOCUMENTS

| | | | |
|---|---|---|---|
| 2,608,461 | 8/1952 | Frazier | 423/245 |
| 2,615,787 | 11/1952 | Randlett | 423/245 |
| 4,212,852 | 7/1980 | Aibe et al. | 423/245 |
| 4,215,096 | 7/1980 | Sinha et al. | 423/245 |

Primary Examiner—Andrew H. Metz
Assistant Examiner—Adriana L. Mui
Attorney, Agent, or Firm—Leon E. Tenenbaum

[57] ABSTRACT

In a process for removing amines having normal boiling points under 100° C., present in an oxygen-containing gas, which comprises passing the amine-containing gas through activated carbon and releasing the gas into the atmosphere, said gas containing from about 5 ppm by volume to about 5,000 ppm by volume of amines, the improvement which comprises adding about 500 ppm to about 30,000 ppm by volume of gaseous carbon dioxide to said gas prior to passing the gas through the activated carbon.

4 Claims, No Drawings

REMOVAL OF AMINES FROM AIR STREAMS

This invention relates to the removal of amines from air streams that are discharged into an ambient atmosphere. It particularly relates to an improved process for the removal of amines from air streams prior to their discharge into the atmosphere.

BACKGROUND OF THE INVENTION

Amines have long been known to be extremely and objectionably odorous even in very low concentrations in air. Their odors are detectable in air in concentrations as low as a few parts per billion by volume, or even in fractions of a part per billion. Furthermore, amines are produced by many natural as well as industrial processes or operations. For example, the bacterial decomposition of nitrogenous organic matter produces amines, and therefore amines are present in the atmospheric effluents from sewage and garbage, especially when these materials include wastes from meat and fish. Monomethyl amine occurs in herring brine, in the urine of dogs after they eat meat, and in certain plants. Trimethyl amine is present in menstrual blood and in urine. In addition, amines are widely used in chemical synthesis, and as such inevitably escape to the atmosphere as a result of small leaks, spillages, or displacement by other gases or liquids during the cleaning of equipment in which amines had been processed, transferred, or stored. Trimethyl amine is also formed during the distillation of sugar beet residues. Monomethyl amine and trimethyl amine have pungent, fishy, ammoniacal odors.

The amines that are gaseous at ordinary temperatures and pressures include monomethyl amine (normal boiling point $-6.3°$ C.), dimethyl amine (boiling point $7°$ C.) and trimethyl amine (boiling point $3.5°$ C.) Amines have very low odor threshold concentrations. For example, G. Leonardos, J. Air Pollution Control Association, Vol. 19, p. 91 (1969) has reported the odor threshold of monomethyl amine to be 0.021 parts per million by volume, and the odor threshold of trimethyl amine to be 0.00021 parts per million by volume. Most amines that are liquids or solids at $15°$ to $25°$ C. and normal atmospheric pressure have sufficiently high vapor pressures and sufficiently low odor thresholds so that their vaporization generates strong and unpleasant odors. For example, putrescine (tetramethylene diamine) is a colorless oil that boils at about $160°$ C. at normal atmospheric pressure. It occurs in decaying animal tissues and vaporizes sufficiently to generate the typical odor of protein putrefaction from which it derives its name. Similarly, cadaverine (pentamethylene diamine) is a colorless syrupy liquid with a normal boiling point of about $180°$ C. It is produced by bacterial action on meat and fish and it also occurs in cholera discharge. It, too, vaporizes sufficiently to generate the type of putrid odor from which it derives its name.

Activated carbon is the most effective wide-spectrum medium for removal of odorous matter from air or other gas streams (A. Turk, "Adsorption," Chapter 8 in AIR POLLUTION, Third Ed., Vol. IV, A. Stern, ed., Academic Press, New York, 1977). The deodorizing action of carbon proceeds by means of physical adsorption. Since carbon is a non-polar substance, it does not exhibit preference for polar materials, such as water, but instead is selective in adsorption largely on the basis of the boiling points of the components of a mixture of gases and vapors. Materials of higher boiling points are adsorbed in preference to those of lower boiling points. As expressed by J. W. Hassler in his book, PURIFICATION WITH ACTIVATED CARBON, Chemical Publ. Co., New York, 1974, page 12, "vapors that readily condense to a liquid state will be more readily adsorbed than gases that liquefy only if and when cooled to a low temperature." When odorous materials are present in air at ordinary temperatures, activated carbon is an economically effective medium for odorants whose normal boiling points are above about $60°$ C. Thus, activated carbon is not an economically practical medium for the removal of ammonia (boiling point $-33°$ C.), or the low-boiling amines cited above, but it is an economically practical medium for the removal of putrescine or cadaverine, which have high boiling points. It is assumed in all these comparisons that the activated carbon is not impregnated with any chemical reagent, and therefore operates by physical adsorption.

The capacity of activated carbon for the removal of amines of low boiling point can be enhanced by impregnating the carbon with a chemical reagent. Amines are weak bases, which can be rendered odorless by reaction with strong nonvolatile acids. Thus, if the carbon is impregnated with phosphoric acid, its capacity for the removal of amines of low boiling point is greatly enhanced. The salt formed, an alkylammonium hydrogen phosphate, remains on the carbon and the treated air has thus been deodorized. Another effective impregnant for carbon is zinc acetate. The zinc ion forms complexes with amines, which likewise remain on the carbon, thus contributing to the deodorization of the treated air. However, the phosphoric acid, zinc acetate, or any other impregnant on the carbon occupies some of surface area and pore volume of the adsorbent, and thus reduces its capacity for physical adsorption. For amines of higher boiling points, such as putrescine and cadaverine, the enhanced capacity offered by an impregnant such as phosphoric acid or zinc acetate is offset by the reduced capacity for physical adsorption, and the result may be no net gain or even a net loss. Furthermore, many air streams that contain amines are also contaminated with other malodorous gases and vapors, such as mercaptans, sulfides, and fatty acids. These vapors are not trapped at all by the impregnants that are effective for amines, so that such impregnations can only reduce the capacity of the carbon for these other malodorants.

THE PRESENT INVENTION

It is accordingly an object of this invention to provide an improved process for removing amines having normal boiling points under about $100°$ C., present in gas streams containing oxygen, such as air streams, by passing the said stream through activated carbon.

It is another object of this invention to provide such improvement in the removal of amines having normal boiling points below about $100°$ C., without significantly detracting from the capacity of the activated carbon for physical adsorption of amines of higher boiling points or of other malodorous or toxic gases and vapors that may be present along with the amines.

It is yet another object of this invention to provide the aforementioned improvements when the gas stream contains moisture.

Other objects will appear in the description that follows.

This invention provides an improved process for the removal of amines having normal boiling points under about 100° C., present in oxygen-containing gas streams such as air, which involves adding carbon dioxide to the amine-containing air stream and then passing the stream through activated carbon.

I have now found that the addition of carbon dioxide gas to the air stream containing such amines having normal boiling points under 100° C. greatly increases the capacity of the activated carbon for the said amines. Carbon dioxide being a very weak acid is not and would not be effective in removing amines, which are weak bases, in the absence of activated carbon. For example, it does not work in a scrubber. Carbon dioxide (sublimation point −78.5° C.) is odorless and is not significantly retained by the activated carbon at normal temperatures, so that the capacity of the carbon for physical adsorption of amines of higher boiling points or of other gases and vapors is not adversely affected.

In accordance with this invention, there is provided an improvement in the process for removing amines having normal boiling points under about 100° C., present in an oxygen-containing gas stream, e.g. air, when said amine-containing air stream is passed through activated carbon and then released into the atmosphere, said air stream containing from about 1 ppm to about 5,000 ppm by volume of amines, which improvement comprises the addition of from about 500 ppm to about 30,000 ppm by volume of gaseous carbon dioxide to said air stream.

The amine-containing air stream is preferably passed through the activated carbon at a rate that will afford a contact time within the bed of at least about 0.5 seconds. The carbon dioxide is preferably introduced into the amine-containing air stream at a concentration of about 500 ppm to about 10,000 ppm by volume.

It is also preferred to have some moisture present in the air stream although the process is also effective when dry (i.e. having 0% relative humidity (R.H.)) air streams are processed. Preferably, the air stream will have a relative humidity ranging from 0 to 80%.

The invention will become clearer from the examples that follow. These examples are given for illustration only, and are not considered to be limiting.

EXAMPLE 1

In a laboratory test, an air stream at room temperature (20° C.) and at 80% relative humidity containing 1030 ppm by volume of monomethyl amine was introduced into a cylindrical column of granular activated carbon that was 1 inch in diameter and 2.75 inches in the direction of air flow, at a volumetric rate of 1450 mL/min. These conditions correspond a contact time (bed volume/total flow rate) of 1.46 seconds. The effluent air stream was odorless at first, but a definite odor of monomethyl amine was recognizable after 55 minutes.

EXAMPLE 2

The conditions of Example 1 were repeated with the modification that 40 mL per minute of pure carbon dioxide gas were introduced into the air stream. The 1030 ppm concentration of monomethyl amine and the total gas flow of 1450 mL/min were maintained. The $CO_2$ concentration was thus $(40/1450) \times 100\%$, or about 2.8% by volume. The effluent air stream was odorless at first, but a definite odor of monomethyl amine was recognizable after 230 minutes. This breakthrough time represents an improvement in the capacity of the carbon over that realized in Example 1 by a factor of 230/55, or 4.2.

The conditions of Example 2 were repeated with progressive reduction of the $CO_2$ concentration, as shown in Table 1. All the concentrations in the table are given in percent or ppm by volume, as noted. The conversion is 1% = 10,000 ppm.

TABLE 1

| Example No. | Concentration of $CO_2$ | Time To Breakthrough | Improvement Factor (time/55) |
|---|---|---|---|
| 3 | 1.0% | 250 min | 4.0 |
| 4 | 0.5% (5000 ppm) | 235 min | 4.3 |
| 5 | 3000 ppm | 215 min | 4.1 |
| 6 | 2000 ppm | 215 min | 4.1 |
| 7 | 1500 ppm | 210 min | 3.8 |
| 8 | 1030 ppm | 195 min | 3.5 |
| 9 | 500 ppm | 66 min | 1.2 |

The conditions of Examples 1 and 2 were repeated with the modification that the air was dried to 0% R.H., with various concentrations of $CO_2$, as shown in Table 2.

TABLE 2

| Example No. | Concentration of $CO_2$ | Time To Breakthrough | Improvement Factor (time/37) |
|---|---|---|---|
| 10 | none | 37 min | — |
| 11 | 1.0% | 120 min | 3.2 |
| 12 | 0.5% (5000 ppm) | 120 min | 3.2 |
| 13 | 2000 ppm | 115 min | 3.1 |
| 14 | 1030 ppm | 105 min | 2.8 |
| 15 | 500 ppm | 45 min | 1.2 |

The conditions of Examples 1 and 2 were repeated with various concentrations of monomethyl amine (MMA) and $CO_2$, as shown in Table 3. All concentrations are given in ppm by volume.

TABLE 3

| Example No. | Concentration of MMA | $CO_2$ | Time To Breakthrough | Improvement Factor |
|---|---|---|---|---|
| 16 | 2000 | 0 | 24 min | — |
| 17 | 2000 | 4000 | 82 min | 82/24 = 3.4 |
| 18 | 3000 | 0 | 15 min | — |
| 19 | 3000 | 6000 | 48 min | 48/15 = 3.2 |

The following examples show the action of $CO_2$ and activated carbon on trimethyl amine.

EXAMPLE 20

The conditions of Example 1 were repeated with the following modifications: The amine was trimethyl amine (TMA) at 1024 ppm by volume and the carbon bed was 9 inches in the direction of air flow, corresponding to a contact time of 4.8 seconds. The effluent air stream was odorless at first, but a definite odor of TMA was recognizable after 210 minutes.

Various modifications of Example 20 are shown in Table 4. All concentrations are in ppm by volume.

TABLE 4

| Example No. | Concentration of TMA | $CO_2$ | R. H. | Time to Breakthrough | Improvement Factor |
|---|---|---|---|---|---|
| 21 | 1024 | 28,000 | 80% | 384 min | 384/210 = 1.8 |
| 22 | 1024 | 10,000 | 80% | 380 min | 380/210 = 1.8 |
| 23 | 1024 | 3,000 | 80% | 390 min | 390/210 = 1.9 |
| 24 | 1024 | 1,500 | 80% | 375 min | 375/210 = 1.8 |
| 25 | 1024 | 500 | 80% | 275 min | 275/210 = 1.3 |
| 26 | 1024 | — | 0% | 250 min | — |
| 27 | 1024 | 28,000 | 0% | 374 min | 374/250 = 1.5 |

TABLE 4-continued

| Example No. | Concentration of TMA | CO$_2$ | R. H. | Time to Breakthrough | Improvement Factor |
|---|---|---|---|---|---|
| 28 | 1024 | 3,000 | 0% | 380 min | 380/250 = 1.5 |
| 29 | 1024 | 500 | 0% | 300 min | 300/250 = 1.2 |

Other modifications were made to test a lower TMA concentration. In order to avoid excessively long experiments, the contact time was reduced to 1 second by shortening the bed in the direction of air flow to 3 inches and increasing the total flow to 2320 mL/min. The results are shown in Table 5.

TABLE 5

| Example No. | Concentration of TMA | CO$_2$ | R. H. | Time to Breakthrough | Improvement Factor |
|---|---|---|---|---|---|
| 30 | 5 | 0 | 0 | 93 hr | — |
| 31 | 5 | 500 | 0 | 121 hr | 121/93 = 1.3 |
| 32 | 5 | 3,000 | 0 | 130 hr | 130/93 = 1.4 |
| 33 | 5 | 10,000 | 0 | 149 hr | 149/93 = 1.6 |
| 34 | 5 | 0 | 80 | 97 hr | — |
| 35 | 5 | 500 | 80 | 126 hr | 127/97 = 1.3 |
| 36 | 5 | 3,000 | 80 | 145 hr | 145/97 = 1.5 |
| 37 | 5 | 10,000 | 80 | 165 hr | 165/97 = 1.7 |
| 38 | 100 | 0 | 0 | 5 hr | — |
| 39 | 100 | 3,000 | 0 | 7 hr | 7/5 = 1.4 |
| 40 | 100 | 10,000 | 0 | 8.5 hr | 8.5/5 = 1.7 |
| 41 | 100 | 0 | 40 | 6.5 hr | — |
| 42 | 100 | 3,000 | 40 | 10.4 hr | 10.4/6.5 = 1.6 |
| 43 | 100 | 10,000 | 40 | 112.4 hr | 11.7/6.5 = 1.8 |

I claim:

1. In a process for removing amines having normal boiling points under about 100° C. which amines are present in an oxygen-containing gas, from said gas, which comprises passing said gas through activated carbon and releasing the gas into the atmosphere, said gas containing from about 5 ppm to about 5,00 ppm by volume of said amines and having a relative humidity from about 0 to about 80%, the improvement which comprises adding to said gas from about 500 ppm to about 30,000 ppm by volume of carbon dioxide prior to the passage of the gas through the activated carbon.

2. A process according to claim 1 wherein the oxygen-containing gas is air.

3. A process according to claim 2 wherein the air is passed through activated carbon in the form of a bed at a rate that will afford a contact time within the bed of at least 0.5 second.

4. A process according to claim 3 wherein from about 500 ppm to about 10,000 ppm by volume of carbon dioxide is added to the air.

* * * * *